United States Patent [19]

Little

[11] Patent Number: 5,322,472

[45] Date of Patent: Jun. 21, 1994

[54] COMBINE HARVESTER WITH DUST COLLECTION

[76] Inventor: Clinton W. Little, Box 44, Decker, Manitoba, R0M 0K0, Canada

[21] Appl. No.: 974,607

[22] Filed: Nov. 12, 1992

[51] Int. Cl.⁵ ............................................. A01F 12/54
[52] U.S. Cl. .................................... 460/117; 460/100; 460/119; 56/DIG. 8
[58] Field of Search ................. 460/117, 37, 100, 119; 56/14.5, 14.6, 13.3, DIG. 8

[56] References Cited

U.S. PATENT DOCUMENTS

| | | | |
|---|---|---|---|
| 2,832,187 | 4/1958 | Johnson | 460/117 X |
| 3,126,810 | 3/1964 | Karlsson et al. | 56/DIG. 8 X |
| 3,187,491 | 6/1965 | Karlsson | 56/DIG. 8 X |
| 4,866,919 | 9/1989 | Brooks | 56/DIG. 8 X |

Primary Examiner—Terry Lee Melius
Attorney, Agent, or Firm—Adrian D. Battison; Stanley G. Ade; Murray E. Thrift

[57] ABSTRACT

A conventional header of a combine harvester includes a sickle knife and a table onto which the crop material is deposited by a reel. The crop material is transported toward the feeder housing of the combine harvester by an auger transportation system. At the feeder housing, the auger includes a cylindrical drum portion with fingers to push the material into the feeder housing. This conventional arrangement is modified by the addition of a suction shroud positioned over the central cylindrical portion of the auger to extract dust when cutting dusty crops such as peas.

11 Claims, 3 Drawing Sheets

COMBINE HARVESTER WITH DUST COLLECTION

BACKGROUND OF THE INVENTION

This invention relates to a combine harvester having a header for collecting cut crops and including a dust collection system to reduce the release of dust extracted from the crop by the harvesting action.

Combine harvesters are of course very well known and many different designs are manufactured by the main line manufacturer such as John Deere, International Harvester and Klaas. The design of these machines including a header for either effecting a straight cutting action or for pick-up of crops from a windrow or swath has been modified and improved over the years to obtain the best cutting and harvesting action.

However existing combine harvesters in some crops such as peas, lentils and canola have significant disadvantages in that the crop material itself generates high levels of dust which are then released by the harvesting action into the atmosphere.

The header includes a sickle knife or pick-up extending across the front edge of the header and there is provided a reel mounted above the sickle knife for sweeping the crop material rearwardly. On the header is mounted an auger transport system in the form of a rigid elongate tube extending across the full width of the header with that tube carrying auger flights on the outside surface which extend from the outermost edges inwardly toward the center of the header. At the center of the header the tube carries fingers which rotate with the tube to sweep the material carried by the auger flights rearwardly and upwardly for introduction into the feeder housing of the combine through an opening at the rear of the header frame.

In harvesting such dusty crop materials, the harvesting is seriously inhibited by the amount of dust that is generated by the crop so that the operator has difficulty observing the harvesting action and directing the combine harvester in the required cutting direction. In many cases, therefore, once the amount of illumination is reduced by dusk, it is no longer possible to continue the harvesting even with the relatively powerful lights available on modern combine harvesters.

It is one object of the present invention, therefore, to provide an arrangement for removing dust from the crop on a combine harvester of this type.

According to the invention, therefore, there is provided a combine harvester comprising a main combine body having ground wheels for movement of the combine body across the ground, a feeder housing mounted on the combine body extending forwardly therefrom and defining a duct through which cut crop can be fed, a header mounted on the feeder housing for transport thereby across the ground, the header including a header frame extending transversely of the feeder housing, an opening on the header frame at the feeder housing allowing passage of crop material from the header frame into the feeder housing, an auger transport device mounted on the header and rotatable about an axis longitudinal of the frame, the auger transport device carrying helical flight portions arranged to move the crop material inwardly of the header frame to said opening, means for feeding the crop material from the helical flight portions into the feeder housing through the opening, and suction means located on the header frame adjacent the opening arranged to draw dust from the area of the opening while allowing the crop material to be fed into the feeder housing.

One embodiment of the invention will now be described in the conjunction with the accompanying drawings in which.

In the drawings like characters of reference indicate corresponding parts in the different figures.

DETAILED DESCRIPTION

Figure 1:
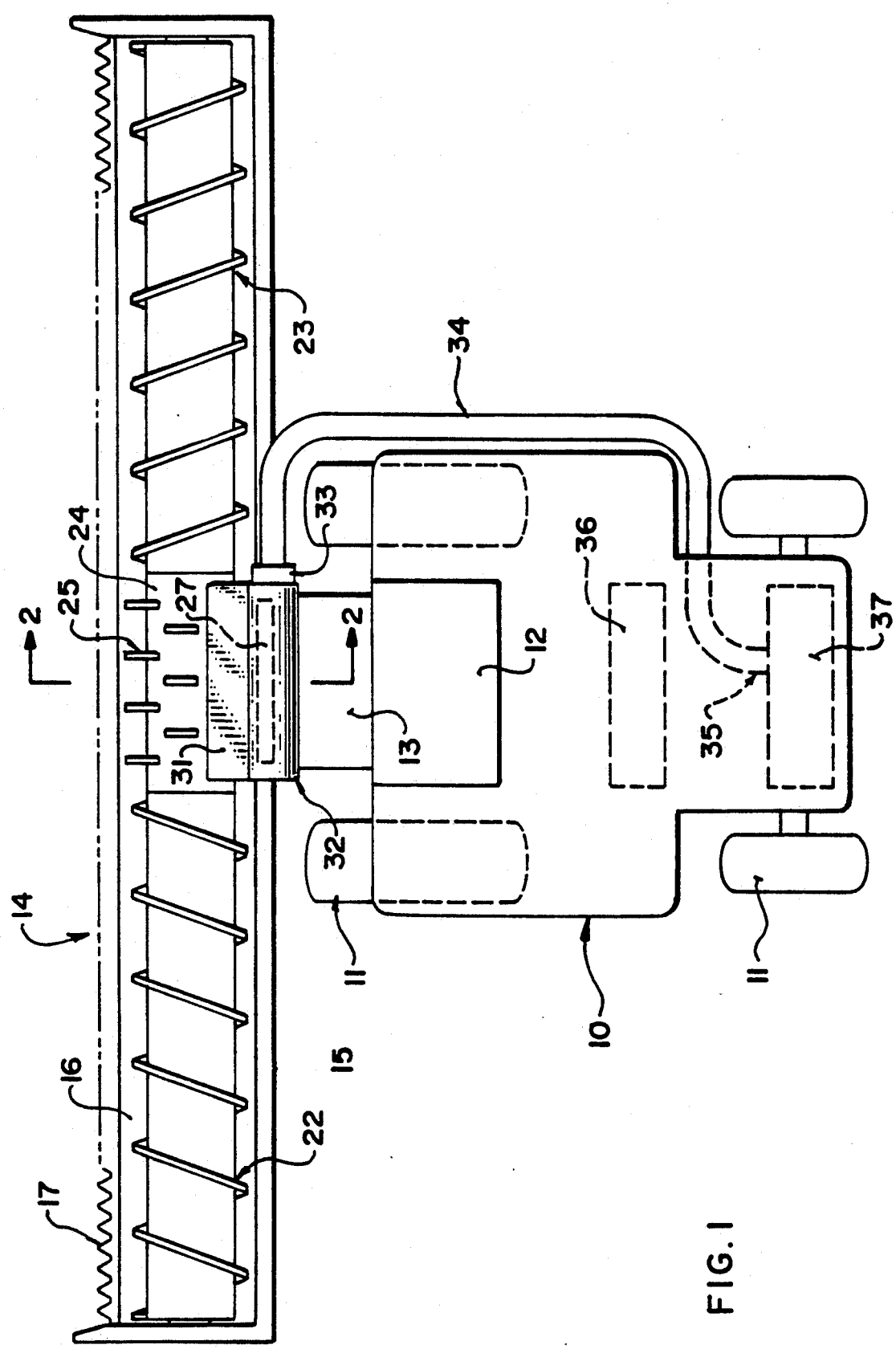
FIG. 1 is a top plan view of a combine harvester according to the present invention, with the reel omitted for convenience of illustration.
Figure 2:
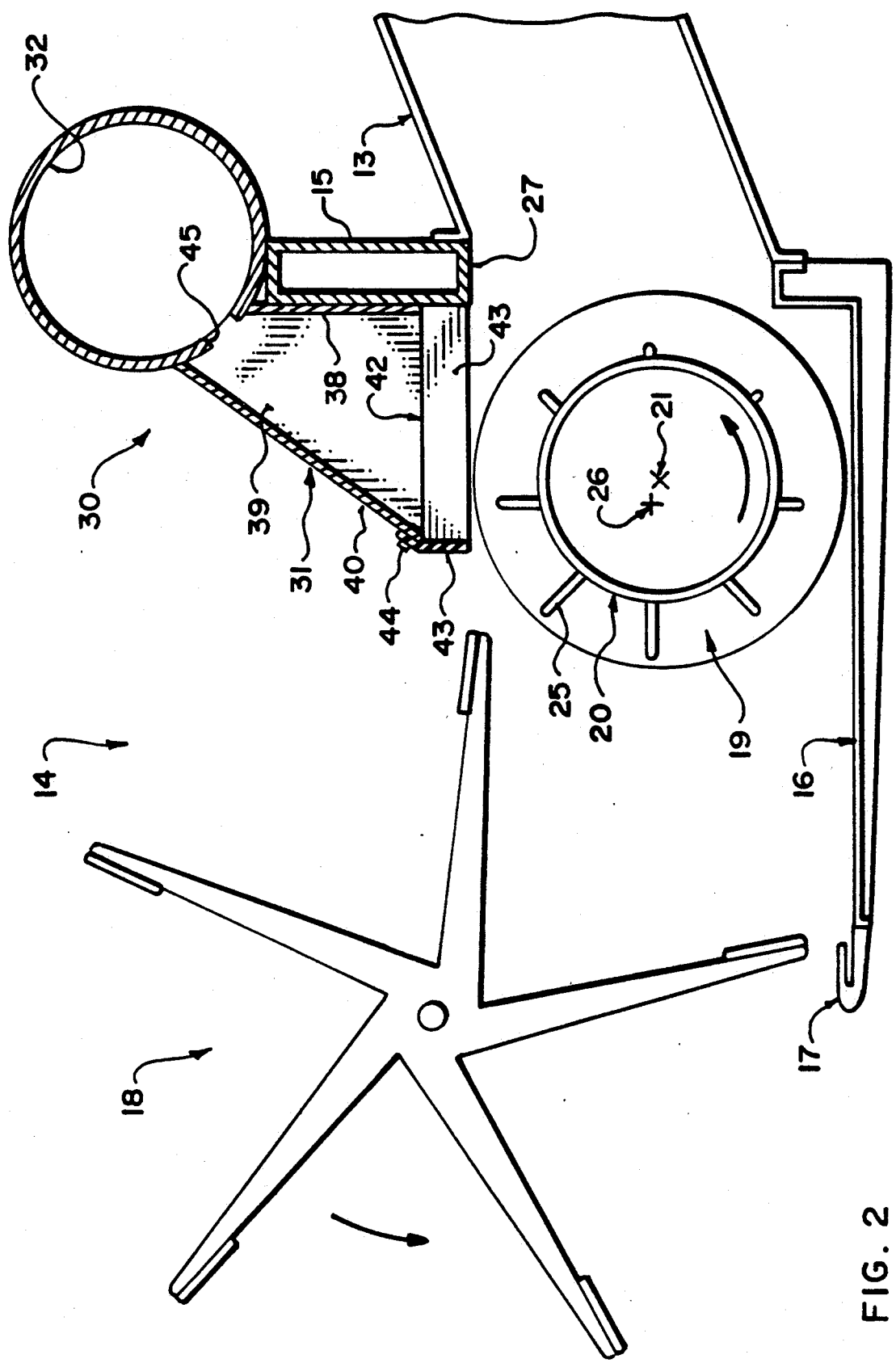
FIG. 2 is a cross sectional view along the lines 2—2 of FIG. 1.
Figure 3:
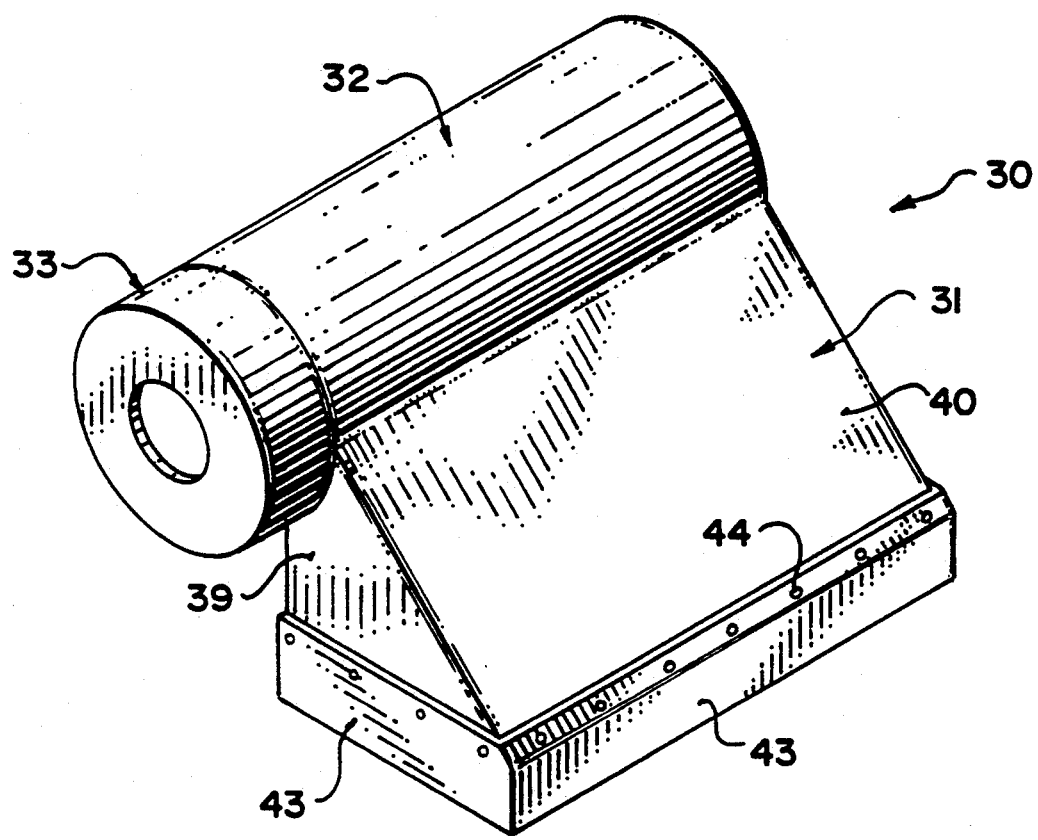
FIG. 3 is an isometric view of the dust removing system of FIGS. 1 and 2.

The combine harvester shown in FIGS. 1 and 2 is generally of conventional nature and is thus shown schematically and described hereinafter only in broad terms. The combine harvester thus comprises a main frame generally indicated at 10 mounted on ground wheels 11. The main frame is self-propelled and includes a cab section generally indicated at 12 mounted forwardly of the main frame between the front wheels.

At the forward end of the main frame is provided a feeder housing 13 which is arranged to receive crop material from a header 14 for transportation upwardly and rearwardly from the header into the main housing for crop separation in conventional manner. The feeder housing comprises a rectangular tubular duct with a transportation system mounted therein (not shown) for carrying the crop material upwardly and rearwardly into the main frame. The header is attached to the front of the feeder housing for movement therewith and comprises a transverse frame structure 15 to which is attached a forwardly extending table 16. At a front edge of the table is mounted a sickle knife 17 which extends across the full width of the header and acts to cut the standing crop which is then caused to fall onto the table 16. The movement of the crop is controlled by a reel 18 which rotates in the direction to sweep the material rearwardly over the sickle knife and onto the table 16.

The crop is transported longitudinally of the header toward the feeder housing 13 by an auger transportation system generally indicated at 19 including a cylinder 20 which rotates about an axis 21 in a direction downwardly and rearwardly so as to turn the crop material underneath the cylinder 20. On the outside surface of the cylinder is mounted two auger flight sections 22 and 23 which are shaped and arranged so that the rotation of the cylinder causes the crop material to be moved inwardly toward the feeder housing 13. The auger flight sections 22 and 23 terminate at a position adjacent the feeder housing 13 at which point is provided a cylindrical drum portion 24 having a plurality of holes through which fingers 25 pass. The fingers are mounted for rotation about an axis 26 which is offset from the axis 21 so that the fingers project outwardly through the holes in the drum 24 in a forward direction but then gradually retract as the fingers move toward the bottom and rear of the drum with the drum so as to release the crop material to enter into the feeder housing through an opening 27 in the frame 15. The opening 27 is rectangular and has a width and height substantially equal to that of the feeder housing.

The above arrangement is conventional and the crop material is effectively carried by the auger transport system 19 toward the feeder housing to enter into the feeder housing for operation of the combine harvester.

Careful observation of the operation of this arrangement by the invention has shown that the generation of dust is effected at the center section including the cylindrical drum portion 24. The invention therefore provides a modification of the conventional header by the provision of a suction shroud system generally indicated at 30.

The suction device comprises a shroud 31 mounted on a front face of the frame member 15 together with a suction duct 32 attached to an upper edge of the shroud 31 and a fan 33 mounted at one end of the duct 32. The fan is preferably of the squirrel-cage type so that it is not necessary for the material to pass over the motor and support therefor when passing along the tube or duct 32 to the fan 33. The material exiting from the fan 33 passes along a transportation duct 34 which has a discharge mouth 35 located at the rear of the combine and possibly associated with either the discharge from the chaffer sieve 36 or the straw chopper assembly 37.

The shroud 31 includes a vertical rear wall 38 extending along and in contact with the beam 15. At the ends of the rear wall 38 are provided two sidewalls 39 which extend forwardly from the beam 15 at right angles thereto. A front wall 40 is inclined forwardly and downwardly from the suction duct 32 so that the width of the sidewall 39 increases toward a lower open mouth 42. The open mouth 42 lies in a substantially plane containing the lowermost edges of the rear wall 38, the side walls 39 and the front wall 40. The open mouth 42 terminates at a position just above the cylindrical portion 24 of the auger transportation system. At the mouth 42 is provided a depending skirt 43 which includes three portions connected to the sidewalls 39 and to the front wall 40 respectively. The skirt is flexible and is fastened by rivets 44 at the lowermost edge of the sidewalls and the front wall respectively. The lower edge of the skirt terminates at a position closely adjacent the upper edge of the discharge opening through the rear of the header into the feeder housing. The flexible skirt allows the skirt to move when impacted by the crop material. The open mouth thus defined by the skirt is positioned just above the cylindrical portion 24 at the opening 27 so as to draw air and entrained material upwardly into the skirt for passage into the tubular duct 32. Between the duct 32 and the shrouds 31 is provided a slot 45. The dimensions of the slot are varied so as to control the suction to remain substantially constant along the length of the shroud.

In operation the crop material is cut and deposited at the auger transportation roller and carried thereby inwardly toward the feeder housing. Careful observation and experimentation by the present inventor has identified that the dust from dusty crop material is released not at the cutting action nor the reel but only at the beating action which is effected by the cylindrical portion 24 and the fingers 25 as the crop material is pushed into the feeder housing. The positioning of the shroud therefore at the entrance to the feeder housing and above the auger system allows the extraction of air into the shroud to carry dust from the crop material away from the header to avoid that dust being released into the atmosphere. This dust collection action prevents the release of dust from obscuring the vision of the driver positioned just above the feeder housing or from entering the area of the driver and causing breathing air contamination.

The device can be used either with a straight-cut header or a pick-up type header. In an alternative arrangement, the fan can be mounted at the rear side of the header frame to improve visibility. The shroud also can have a hinge at the upper edge to allow it to pivot upwardly and rearwardly to allow better access to the area underneath the shroud and in front of the opening in case of a plug in the table auger. A vent can also be provided on the front of the tube 32 to allow dust extraction from the area of the reel.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A combine harvester comprising a main combine body having ground wheels for movement of the combine body across the ground, a feeder housing mounted on the combine body extending forwardly therefrom and defining a duct through which cut crop is fed, the duct having an open mouth at a forward end thereof, a header mounted on the feeder housing for transport thereby across the ground, the header including a header frame extending transversely of the feeder housing, means defining an opening on the header frame at the open mouth of the feeder housing allowing passage of crop material from the header frame rearwardly through the opening into the open mouth of the feeder housing, an auger transport device mounted on the header and rotatable about an axis longitudinal of the frame, the auger transport device carrying helical flight portions arranged to move the crop material cut by the sickle knife inwardly of the header frame to said opening, means for feeding the corp material from the helical flight portions into the feeder housing through the opening, and suction nozzle means located on the header frame immediately in front of the opening and directly above the auger transport device and arranged to draw dust from the area of the opening while allowing the corp material to be fed into the feeder housing through the opening.

2. The combine harvester according to claim 1 wherein the suction means includes a shroud mounted over the opening and having an open end facing downwardly.

3. The combine harvester according to claim 2 wherein the open end is substantially horizontal.

4. The combine harvester according to claim 2 wherein the shroud includes a vertical rear wall positioned at a front face of the header frame and a front wall which extends downwardly and forwardly from the rear wall.

5. The combine harvester according to claim 2 including a flexible skirt extending downwardly from the opening at positions around the opening so as to confine air movement into the shroud while allowing crop material to pass by the flexible skirt to the opening.

6. The combine harvester according to claim 2 including fan means mounted closely adjacent the shroud for drawing air away from the shroud.

7. The combine harvester according to claim 6 including a duct along an upper edge of the shroud with the fan at one end of the duct.

8. The combine harvester according to claim 7 including a slot communicating between the duct and the shroud, the width of the slot varying along the length of the duct.

9. The combine harvester according to claim 6 including a transport duct extending from the fan to a discharge end spaced from the header.

10. The combine harvester according to claim 2 wherein the shroud has a width substantially equal to the width of the opening.

11. The combine harvester according to claim 2 wherein the means for feeding the crop material from helical flight portions into the feeder housing comprises a cylindrical portion of the auger transport device having a plurality of fingers projecting outwardly therefrom and rotatable therewith, and wherein the shroud is arranged to have a width substantially equal to the width of the cylindrical portion.

* * * * *